United States Patent [19]
Atsukawa et al.

[11] 3,888,968
[45] June 10, 1975

[54] METHOD OF SEPARATING IMPURITIES FOR REMOVAL IN DESULFURIZATION OF EFFLUENT GAS IN A WET LIME-GYPSUM PROCESS

[75] Inventors: Masumi Atsukawa; Naoharu Shinoda; Haruo Kuwubara, all of Hiroshima, Japan

[73] Assignee: Mitsubishi Jukogyo Kabushiki Kaisha, Japan

[22] Filed: Nov. 8, 1972

[21] Appl. No.: 304,638

[30] Foreign Application Priority Data
Nov. 11, 1971 Japan.................................. 46-90115

[52] U.S. Cl. .................. 423/242; 423/166; 210/46
[51] Int. Cl............................................. C01b 117/00
[58] Field of Search .......................... 423/242–244, 423/166, 555; 210/46

[56] References Cited
UNITED STATES PATENTS

| | | | |
|---|---|---|---|
| 2,021,672 | 11/1935 | Spaulding | 210/46 |
| 2,080,779 | 5/1937 | Lessing | 423/242 |
| 2,090,142 | 8/1937 | Nonhobel et al. | 423/242 |
| 2,155,853 | 4/1939 | Anthony | 423/242 |
| 2,301,429 | 11/1942 | Magill | 210/46 |

Primary Examiner—O. R. Vertiz
Assistant Examiner—Gregory A. Heller
Attorney, Agent, or Firm—Toren, McGeady and Stanger

[57] ABSTRACT

A method of separating impurities for removal in the desulfurization of effluent gas in a wet lime-gypsum process wherein sulfur oxide is removed from sulfur oxide-containing gas using lime slurry as absorbent, characterized in that, in filtering out from the solution in process such metallic impurities as metallic salts and oxides that come from the dust in the gas and also from material lime, the carbon dust collected from the gas is utilized as nuclei for flocculation of the hydroxides.

2 Claims, 1 Drawing Figure

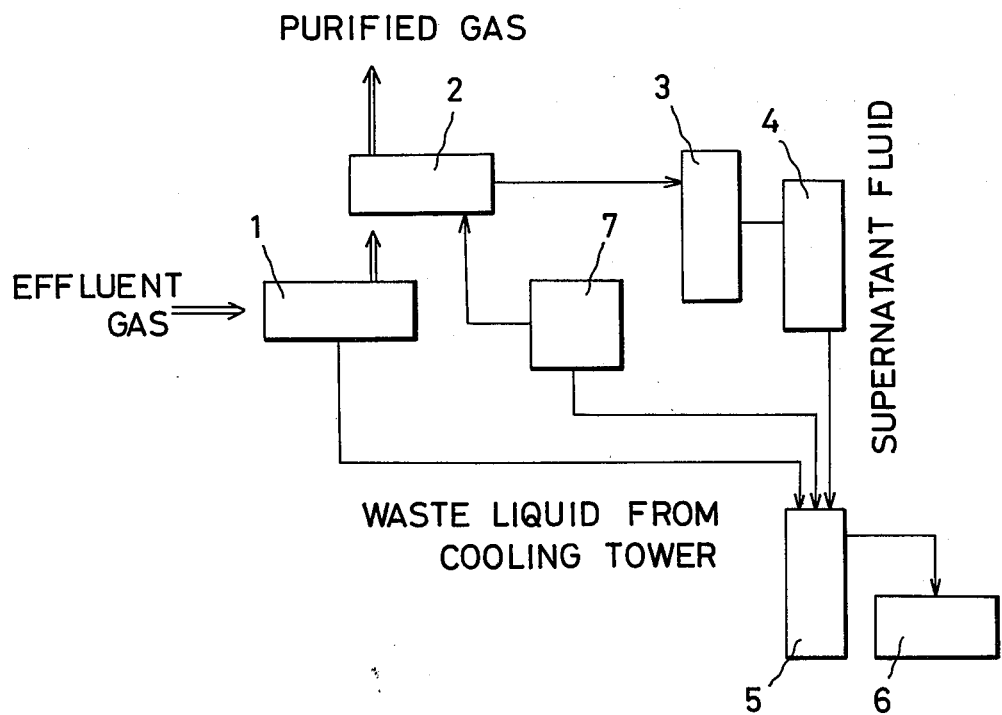

METHOD OF SEPARATING IMPURITIES FOR REMOVAL IN DESULFURIZATION OF EFFLUENT GAS IN A WET LIME-GYPSUM PROCESS

This invention relates to a method of clearing away deposited soot and other metallic impurities from the gas and material line in a process for removing sulfur oxide from sulfur oxide-containing gas wherein a lime slurry solution of hydrated quick lime, slaked lime, calcium carbonate or the like is used as an absorbent.

In a process for reclaiming by-product gypsum with the aid of a lime slurry solution as absorbent, ingress of foreign matter into the system is most undesirable for the following reasons.

First, the presence of foreign matter has a serious effect upon the quality of gypsum to be reclaimed. In order to obtain high grade gypsum, it is important to minimize the intrusion of metallic impurities. Also, a trace of carbon dust can lead to coloring and hence degradation of the by-product.

Second, the foreign matter renders the filtration of the resulting gypsum slurry solution difficult. In the filtration of the gypsum slurry solution, the deposited metallic impurities of Mg, Fe, and Al, for example, form hydroxide flocs. The flocs in turn tend to clog the filter cloth and seriously reduce the capacity of the filter and also make continuous operation difficult.

Third, foreign matter has complex influences upon and hinders the formation of desirable gypsum crystals, a step essential for the manufacture of gypsum by oxidation on an oxidizer of calcium sulfite that is prepared beforehand by allowing a lime slurry solution to absorb sulfur oxide. Generally, gypsum crystals in the form of plates or columns are preferred, but the presence of metallic ions, such as, of aluminum, hinders the crystal growth or adversely affects the crystal formation.

The present invention pertains to a method of efficiently removing soot and other metallic impurities which have very unfavorable effects upon the recovery of high grade gypsum using a lime slurry solution as absorbent. The invention thus permits recycling of the filtrate which has hitherto been abandoned without further treatment (or drained by the so-called one-pass system). This brings a remarkable improvement of the process from the viewpoint of utility and settles the problem of waste draining to a great advantage.

The method of impurity removal according to the present invention will be described in more detail hereunder with reference to the accompanying drawing, in which:

The single FIGURE is a flow chart of an arrangement adapted for reducing the method of the invention into practice.

Generally a process for obtaining gypsum as by-product through desulfurization of smoke by the use of a lime slurry solution involves a plant comprising a cooling tower 1 for humidifying and cooling the smoke and for removing dust from the gas, a gas absorption column an oxidizer 3 for oxidizing the calcium sulfite produced by the absorption of the gas in the absorption column 2 to obtain gypsum as by-product, a slurry concentrator (thickner) 4, a neutralizer 5, and a filter 6. Numeral 7 indicates a slurry absorbent solution. In accordance with the method of the invention, both the waste liquid from the cooling tower 1 that contains the dust collected in the tower and the supernatant fluid from the concentrator 4 that contains impurities from the material lime are introduced, as shown, into the neutralizer 5, where they are mixed and neutralized with part of the lime slurry absorbent solution. As the pH of the mixture is adjusted in this way, flocs of metallic impurities are formed which are then removed by filtration.

Superiority of the method according to the present invention will now be explained in comparison with other conceivable techniques. One possible method is to mix the waste liquid from the cooling tower and the slurry absorbent solution first (in the absence of the cooling tower this procedure would have to be inevitably resorted to), and supply the mixture, via the oxidizer, to the slurry concentrator, where as much soot and other impurities as possible are taken away from the system. In this case most of the soot settles down together with gypsum crystals and their separation becomes very difficult. As a countermeasure it may be considered possible that the soot in the waste liquid from the cooling tower is first filtered out and the filtrate is mixed with the absorbent solution in the same manner as described above. By this procedure insolubles of the dust collected in the cooling tower can be easily separated for removal. The procedure, however, necessitates removal of the impurities from the waste liquid in which they dissolve to avoid secondary pollution. It will then readily occur to one skilled in the art that the problem of impurity removal is solved by neutralizing the supernatant fluid from the concentrator, thereby adjusting the pH of the solution and forming flocs of metallic hydroxides therein. Here the metallic hydroxides take the form of colloidal flocs which are extremely difficult to filter out.

The present invention has for its object the provision of a method by which the difficulty in the removal of impurities as above described is overcome and recovery of high grade gypsum is made possible. The method is very simple; it combines the two features conceived above, the easy filtration of solids out of the waste liquid from the cooling tower and the formation of metallic hydroxide flocs through pH adjustment. According to the invention the waste liquid from the cooling tower and the supernatant fluid from the concentrator are mixed and neutralized with part of the absorbent solution, so that metallic impurities form their hydroxides and shift toward the solid phase. As a result, the insoluble solids (mostly carbon particles) in the waste liquid from the cooling tower serve as nuclei to form large flocs which are very easy to filter out. Moreover, because the filtrate is recycled as service water for the process, the method of the invention is extremely advantageous from the standpoints of economy of industrial water and prevention of secondary pollution.

The present invention is illustrated by non-limitative examples to be given later. In the examples, exhaust gas from a small oil-burning boiler was treated at the rate of 2,000 Nm$^3$/hr with a lime slurry absorbent solution. At the point where the operating conditions became stable and constant, the lime slurry absorbent solution, waste liquid from the cooling tower, and supernatant fluid from the concentrator were sampled and tested in the manner now to be described.

EXAMPLE 1

The waste liquid from the cooling tower was filtered, and the filtrate was mixed with the supernatant fluid from the concentrator in a ratio by volume of 1:6.5.

The mixed solution (A) was mixed and neutralized with the slurry absorbent solution (B) in a ratio by volume of 18:1. The neutralized solution was filtered and its specific filtration resistance and separation effect were determined.

Specific filtration resistance of waste water from the cooling tower = $2.4 \times 10^{10}$ m/kg

| | |
|---|---|
| Solution A | pH = 2.1 |
| Solution B | pH = 12.6 |
| Neutralized solution (A + B) | pH = 12.6 | specific filtration resistance = $7.26 \times 10^{12}$ m/kg

The results of an analysis for the composition of metallic impurities were as follows (in mg/l):

| | pH | Fe | V | Ni | Mg | Al | SiO$_2$ |
|---|---|---|---|---|---|---|---|
| Solution A | 2.1 | 49.4 | 2.00 | 3.65 | 22.5 | 75.8 | 5.00 |
| Neutralized filtrate (of A+B) | 12.5 | 4.03 | 1.6> | 0.88 | 5.00 | 3.07 | 36.0 |

EXAMPLE 2

The waste liquid from the cooling tower (C), supernatant fluid from the condenser (D), and the slurry absorbent solution (B) were mixed in ratios by volume of 10:7.9:1, and the specific filtration resistance of the mixed solution and the composition of the filtrate were analyzed.

Specific filtration resistance = $7.0 \times 10^{11}$ m/kg

| | |
|---|---|
| Solution D | pH = 2.2 |
| Solution B | pH = 12.6 |
| Solution C | pH = 1.85 |

The results of analysis were as follows (in mg/l):

| | Fe | V | Ni | Mg | Al | SiO$_2$ |
|---|---|---|---|---|---|---|
| Solution D + C | 125 | 7.04 | 4.59 | 17.5 | 5.55 | 18.0 |
| Neutralized filtrate | 4.60 | 1.6> | 0.58 | 0.50 | 3.0> | 12.0 |
| Impurity removal rate (%) | 96.0 | >77 | 87 | 97 | >45 | 33 |

As can be seen from the table, Fe and Mg that account for the majority of the impurities can be removed with high efficiencies of more than 95 percent and the specific filtration resistance of the neutralized solution is about one-tenth that of Example 1.

What is claimed is:

1. In a method for the removal of sulfur oxide from an effluent gas using a wet lime-gypsum process wherein sulfur oxide is removed from a sulfur oxide containing gas by passing the gas through a cooling tower to remove carbon dust therefrom, and then through a gas adsorption column containing a lime slurry as an absorbent to produce calcium sulfite, passing the calcium sulfite through an oxidizer to convert it to calcium sulfate in the form of a gypsum slurry which is then passed through a slurry concentrator wherein the supernatant fluid therefrom is passed to a neutralizer to precipitate the hydroxides of the metallic impurities, and a filter to separate the hydroxides and to obtain a purified filtrate, the improvement which comprises adding the carbon dust obtained from the cooling tower to the neutralizer to facilitate the precipitation and flocculation of the hydroxides.

2. The method of claim 1 wherein the carbon dust is contained in a waste liquid from the cooling tower, and a supernatant liquid is obtained from the concentrator and said waste liquid, said supernatant liquid, and a portion of the lime slurry are mixed and the mixture is neutralized to precipitate the impurities therein.

* * * * *